United States Patent [19]  [11] 4,039,681
Abdel-Monem  [45] *Aug. 2, 1977

[54] ZINC METHIONINE COMPLEX FOR ACNE TREATMENT

[75] Inventor: Mahmoud M. Abdel-Monem, St. Paul, Minn.

[73] Assignee: Zinpro Corporation, Chaska, Minn.

[*] Notice: The portion of the term of this patent subsequent to Mar. 2, 1993, has been disclaimed.

[21] Appl. No.: 660,661

[22] Filed: Feb. 23, 1976

Related U.S. Application Data

[63] Continuation-in-part of Ser. No. 390,080, Aug. 20, 1973, Pat. No. 3,941,818.

[51] Int. Cl.² .............................................. A61K 31/315
[52] U.S. Cl. ..................................................... 424/289
[58] Field of Search .......................................... 424/289

[56] References Cited

U.S. PATENT DOCUMENTS 3,647,834  3/1972  Martin ............................... 260/429.9

FOREIGN PATENT DOCUMENTS 2,013,426  10/1971  Germany .............................. 424/289
1,029,200  5/1966  United Kingdom ................. 424/289

OTHER PUBLICATIONS

Pories et al., Chemical Abstracts 72:10409r, (1970).
Sumiyuki et al., Chemical Abstracts 50:12885c, (1963).

Primary Examiner—Norman A. Drezin
Attorney, Agent, or Firm—Zarley, McKee, Thomte, Voorhees & Sease

[57] ABSTRACT

Novel pharmaceutical compositions containing 1:1 zinc methionine complex salts having the formula:

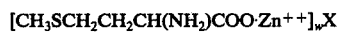

$$[CH_3SCH_2CH_2CH(NH_2)COO\cdot Zn^{++}]_w X$$

wherein X is an anion and w is an integer equal to the anionic charge of X. These compounds when administered in dosage form have been found to have therapeutic effect in the treatment of certain epidermal disorders such as acne.

10 Claims, No Drawings

ZINC METHIONINE COMPLEX FOR ACNE TREATMENT

CROSS REFERENCE TO A RELATED APPLICATION

This application is a continuation-in-part of application Ser. No. 390,080, filed Aug. 20, 1973, and entitled 1:1 ZINC METHIONINE COMPLEXES now U.S. Pat. No. 3,941,818 issued Mar. 2, 1976.

BACKGROUND OF THE INVENTION

The importance of an adequate supply of zinc to the diet of both animals and humans has long been reported in the literature. Adequate dietary intake of zinc for swine, cattle, and poultry has been known for some time to be of importance. For example, when these animals do not have a sufficient level of zinc ions in the diet, the animals may well develop skin conditions showing noted zinc deficiencies. For example, the skin may become scaly and inflamed. In addition, it has been reported in the literature that animals fed a diet deficient in zinc may tend to develop congenital anomalies and fibrotic changes in the esophagus. Additionally, very importantly, an adequate level of zinc in the diets of swine, poultry, and cattle has been shown as important for healthy growth of the animals and increased weight gain.

With regard to humans, zinc deficiencies have been reported as possibly tied to arteriosclerosis, the proper growth and functioning of sex organs, and the ability of skin wounds to heal fast and properly.

One of the common epidermal disorders afflicting humans is the problem of acne. Acne is often characterized by a frequently pustular eruption of the skin, especially the face. The problem of acne is most frequent in occurrence with teenagers but often may occur in preteens or in some instances, older adults.

In addition to the unsightly appearance caused by acne, other problems can and often do occur. For example, the patient may become embarrassed and suffer certin psychological problems. In addition, severe acne cases with infected skin eruptions may result in facial scars which may last for life.

While the importance of an adequate zinc level in the diet of both animals and humans has been known and reported for some time, maintenance of adequate zinc levels in the dietary intake has not necessarily been easy to achieve. Moreover, dietary supplementation by utilization of conventional salts of zinc, such as zinc chloride, seems to be inadequate. This is so because the zinc exists in a form which is not readily absorbed from the gastrointestinal tract and therefore, may not be distributed and utilized effectively in the body.

Methionine, of course, is an essential amino acid needed in the building of body protein and thus critically needed for proper growth of man and other animals.

Accordingly, it is an object of this invention to provide novel zinc compounds wherein the zinc is in a form which can be readily absorbed after ingestion by animals and readily distributed and utilized in order to provide adequate zinc levels for proper health, weight gain, and dietary balance of animals.

Another object of this invention is to provide a method of increasing the body uptake and use of methionine by ingesting 1:1 zinc methionine complexes with the body utilizing a greater proportion of the methionine in protein building than it uses when the compound methionine per se is utilized for nutritional supplementation.

Yet another object of this invention is to provide a process for making novel zinc compounds which is simple to perform and can be economically utilized in large-scale plant practice to prepare the novel zinc compounds of this invention in bulk for ready utilization in large quantities to supplement the diets of animals and humans.

A still further object of this invention is to provide novel pharmaceutical compositions for the treatment of epidermal diseases, such as acne. These compositions contain in dosage form the previously referred to 1:1 zinc methionine complexes.

The method of accomplishing these and other objects will become apparent from the following description of the invention.

SUMMARY OF THE INVENTION

This invention relates to the preparation of novel zinc compounds. The novel zinc compounds have the formula:

wherein X is an anion and W is an integer equal to the anionic charge of X. These compounds all contain a 1:1 ratio complex of zinc and methionine as the cation. Such compounds, it is believed because of a complex formed between the zinc and methionine, are in a form which can be readily absorbed, distributed, and utilized within the biochemical system of animals and humans. They function as a readily-available source of zinc and methionine for dietary supplementation and when provided in novel pharmaceutical compositions have been found to be therapeutically effective in treating epidermal disorders such as acne.

The invention also relates to a new, simple, and economically feasible process for making the above-described compounds.

DETAILED DESCRIPTION OF THE INVENTION

It is important to note that the compounds of this invention are referred to herein as "zinc methionine complexed salts." These salts are to be carefully distinguished from conventional salts such as, for example, zinc sulphate and zinc chloride, which contain only an electrostatic attraction between the cation and the anion. The complexed salts of this invention differ from conventional salts in that while they have an electrostatic attraction between the cation and the anion, there is also a coordination bond formed between the zinc and the amino moiety of the amino acid methionine. The zinc methionine complexed salts have the formula:

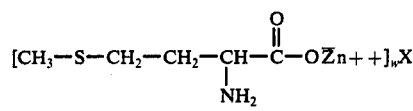

wherein X is an anion and w is an integer equal to the anionic charge of X. The cation of these complexed salts is represented by the bracketed material in the above formula and represents a 1:1 complex of zinc and methionine. Sterically, the cation moiety can be represented as follows:

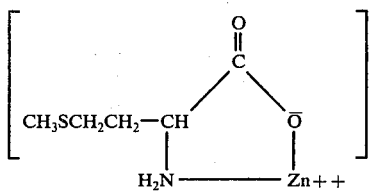

As can be seen from this formula, the five-membered ring formation exists wherein the zinc ion is complexed by coordinate bond with the amine moiety, and electrostatic attraction with the carboxyllic acid moiety of the methionine. In addition, the complex is formed by a 1:1 ratio of methionine molecules and zinc ions with each zinc ion becoming complexed with one methionine molecule. Providing 1:1 complex ions of the zinc and methionine has been found of great importance in insuring gastro-intensinal absorption of the zinc and methionine and their subsequent distribution and effective utilization.

In addition, certain of these compounds, and in particular, zinc methionine acid sulphate, and zinc methionine chloride have been found to have some therapeutic effect in the treatment of acne, colitis and other epidermal disorders.

In the above-described formula, X represents the anion. The selection of an anion is not critical. The anion can be an inorganic anion, an organic anion, a monovalent anion, a divalent anion, or a polyvalent anion. However, in order to have the molecules of the salt balanced electrostatically, $w$ is a whole number integer equal to the anionic charge of the anion X.

Preferably, the source of the anion, X, is an inorganic acid. Suitable inorganic anions can be found in the halogen acids family, the sulphates, and the phosphates. Preferably, where the anion is an iorganic anion, it is selected from the group consisting of monovalent anions, such as halides, hydrogen sulphate, and dihydrogen phosphate. Utilization of monovalent anions selected from the above group is preferred because of the resulting ready solubility of the zinc methionine complexed salts and because of the readily-available sources of common inorganic anions such as the halides, hydrogen sulphate, and dihydrogen phosphate. Most preferably, the anion is selected from the group consisting of chloride and hydrogen sulphate or acid sulphate, the latter two terms being utilized herein interchangeably.

As heretofore briefly mentioned, the anion can also be an organic anion moiety derived from an organic acid. It can be derived from simple aliphatic carboxyllic acids, both monobasic carboxyllic acids and dibasic carboxyllic acids. For example, the anion can be acetate or propionate, or where the acid is a dibasic acid, succinate or adipate. In addition, the acid source can be substituted aliphatic acids, both monobasic and dibasic, such as, for example, chloroacetic acid. The acid source of the anion may also be aromatic acids such as, for example, benzoic acid. It can also be aralkyl acids, both substituted and unsubstituted.

Where organic acid sources are utilized as the source of the anion for the salts of this invention, it is preferred that the source be a monobasic carboxylic acid and that the acid be either acetic acid, propionic, or benzoic.

Surprisingly, a simple, straight-forward and, importantly, economically feasible process of preparing these zinc methionine complexed salts of this invention in the form readily utilizable for dietary supplementation has been developed. For purposes of clarity of description of the invention and conciseness, the method will be described only with relationship to preparing the two most preferred compounds, zince methionine acid sulphate and zinc methionine chloride. It should be understood, however, that the method can easily be modified for preparation of other zinc methionine complexed salts such as zinc methionine diacid phosphate, zinc methionine acetate, zinc methionine proprionate, zinc methionine benzoate, and the like. Zinc methionine acid sulphate and zinc methionine chloride are the preferred compounds because they can be easily prepared and, importantly, have been found to have special preferred efficacy in dietary ingestion and body distribution and utilization. The method will first be described in connection with the preparation of zinc methionine acid sulphate.

In accord with the process of this invention, zinc sulphate, either in an anhydrous form or in a hydrated form is reacted with methionine at a pH of 7 or less. It is important that the pH be controlled to (6–7.5) either neutral or acid conditions because if the pH is allowed to become basic (greater than 7.5), the resulting product will be a 1:2 salt of methionine and zinc which is insoluble in water. The reactants, zinc sulphate and methionine are used in equimolar quantities. Utilization of equimolar quantities insures complete reaction with a minimum of side reactions, or excess ingredients. It is preferred that the zinc sulphate be hydrated zinc sulphate, in that little water is needed. Where anhydrous zinc sulphate is utilized, it is preferred that a quantity of water be added to the reaction ingredients about equal to the weight of zinc sulphate and methionine.

The product, zinc methionine acid sulfate, can be conveniently obtained from the reaction solution by the addition of an organic solvent such as isopropyl alcohol, acetone or ethyl alcohol. Alternatively, the reaction solution could be dried using conventional drying methods such as hot air oven, spray drying, or freeze drying to provide a white, solid, uniform free flow appearing powdered form of zinc methionine acid sulphate.

The reaction can be carried out under similar conditions of pH, to prepare zinc methionine chloride by substituting zinc chloride as an initial reaction ingredient for the zinc sulphate previously described herein. However, the resulting product is zinc methionine chloride, which is very soluble in water and is obtained as a syrupy concentrated aqueous solution.

An important feature of the 1:1 complexed salts, having zinc methionine complexes as a cation and associated with suitable anions, is that the stability of the zinc methionine complex is such that after absorption, the zinc and methionine can be readily utilized within the animal's body biochemical systems. This is to be contrasted from complexes of zinc and other complexing agents such as ethylenediamine tetraacetic acid. In these cases the stability of the complexes is so great that the zinc is not readily released and is therefore not available for distribution and utilization within the animal's body. In fact, there is a tendency for ethylenediamine tetraacetic acid to "draw" zinc molecules from the body and to complex them with the resulting complex being excreted. Thus, extremely strong coordinate covalent bonds, such as those formed by ethylenediamine tetraacetic acid, can actually enhance zinc deficiency in an animal's body biochemical system.

Methionine, of course, is an essential amino acid needed in the building of body protein and thus critically needed for proper growth of man and other animals. It has now been found that 1:1 complexes of zinc and methionine, for some unknown reason, result in body conversion of more of the methionine to protein than does the simple feeding of the compound methionine. And, of course, the important feature for proper diet and growth is not the quantity of methionine fed but the conversion of that methionine to body protein. Feeding compositions with 1:1 zinc methionine complexes added thus provide enhanced methionine efficiency since more of it is actually used for the desired result, i.e., protein making.

The amount of the complexes employed in the feeding operation is not critical. Even very small amounts provide some benefit. The amount, however, should be sufficient to provide effective supplementation. For animal feed supplements from about 50 to about 500 grams per ton of feed is sufficient. Preferably from about 100 to about 350 grams per ton are employed.

The 1:1 zinc methionine complexes of this invention when used for the treatment of epidermal disorders such as acne may be administered as pure compounds. It is advisable, however, to first combine one or more of the novel compounds with a suitable pharmaceutical carrier to attain a more satisfactory size to dosage relationship and to provide the active ingredient in a more acceptable pharmaceutical form.

Pharmaceutical carriers which are liquid or solid may be used. Flavoring materials may also be included as is well known to those skilled in the art of preparing pharmaceutical compositions.

Solid pharmaceutical carriers such as starch, sugar, talc, manitol and the like, may be used to form powders. Manitol is often a preferred solid carrier. The powders may be used as such for direct administration to a patient or instead, the powders may be added to suitable foods and liquids to facilitate administration.

The powders may be used to make tablets or to fill gelatin capsules.

Unit dosage forms such as tablets and capsules may contain any suitable predetermined amount of one or more of the 1:1 zinc methionine complexes, advisably as a non-toxic acid addition salt, preferably 1:1 zinc methionine acid sulphate, and may be administered one or more at a time at regular intervals.

As heretofore explained with regard to utilization of the novel compounds of this invention as active ingredients for the treatment of acne, it is preferred that the compounds be administered with the anion of the compound being in the form of a non-toxic acid addition salt such as for example, the acid sulphate, chloride, bromide, acetate or the like. Preferably, the compound is a non-toxic salt wherein the anion is the anion of commonly used inorganic acids such as chloride, sulphate, acid sulphate, phosphate, acid phosphates, and the like; however, certain common organic acid anions may be employed such as the acetate. In any event, in addition to being non-toxic, it must be an anion which is inert from the standpoint of not affecting the therapeutic effectiveness of the 1:1 zinc methionine complex for its acne treating purposes. All of the anions mentioned above fall into this category.

The oral route is preferred for administering the active 1:1 zinc methionine complexes.

Dosages may vary considerably within the range of from about 50 milligrams per day up to as much as 1500 milligrams per day. More typically, dosages will be within the range of from 200 milligrams per day to about 750 milligrams per day. Of course, the exact dosage will depend upon the patient's need and the patient's weight and age. Typically, the tablets for the pharmaceutical composition will be administered on a periodic schedule just before meals with each dosage being a portion of the recommended daily dosage. For zinc methionine acid sulfate, the recommended dosage is from 100 milligrams to 250 milligrams, two to three times daily. The optimum dose is about 230 milligrams, three times daily.

It is not precisely known why the compounds of this invention are therapeutically effective in the treatment of acne. As heretofore explained, and as hereinafter demonstrated in the examples, providing 1:1 zinc methionine complexes results in a greater body absorption of the methionine than does treating with methionine alone. While applicant does not wish to be bound by any theory, it is believed that the reason for the effectiveness is related to the fact that the zinc and the methionine are bound by a coordinate covalent bond as earlier explained herein and that as a result of that bond and the association between the zinc and the methionine for some unknown reason, greater absorption of the methionine and zinc occurs because of an increased ability to penetrate the intestinal mucosa more completely. In any event, whatever the theory behind the reason for the invention working, the fact of the matter is that the compounds of the invention are surprisingly effective in the treatment of epidermal disorders such as acne.

The following examples are offered to further illustrate the product and process of this invention.

EXAMPLE 1

Hydrated zinc sulphate ($ZnSO_4.7H_2O$, 28.75g, 0.1 mol) and methionine (14.9g, 0.1 mol) were dissolved in 100 ml of water by the aid of gentle heat. The hot solution was treated with 3,000 ml of acetone, stirred vigorously for 10 minutes and allowed to cool. A white precipitate was formed, filtered and dried. The weight of the precipitate was 31.0 g. The precipitate was analyzed by routine analytical procedures and was found to contain 20.80% zinc and 47.45% methionine. This will reveal a proper ratio of zinc and methionine to indicate a 1:1 ratio, indicating the formation of a 1:1 complex. In addition, the sample was analyzed by infra red analysis and an examination of the absorption peaks indicated the absence of a strong peak at 2100 reciprocal centimeters, which is characteristic of alpha amino acids. In addition, there was a noted absence of the characteristic peaks of methionine itself. The different peak structures of the product from the peak structures of the reactants indicated the formation of a 1:1 complex of zinc and methionine. Finally, the resulting product was titrated with .1 normal sodium hydroxide and the titration curve was compared with a known titration curve for DL methionine and zinc sulphate. The titration curve proved to be different than the titration curve for either zinc sulphate or DL methionine, indicating formation of the complex salt.

EXAMPLE 2

Hydrated zinc sulphate ($ZnSO_4.7H_2O$, 57.5 g 0.2 mol) and methionine (29.84 g, 0.2 mol) were mixed thoroughly in an evaporating dish. The mixture was heated on a steam bath to form a paste. Heating was continued for 60 minutes and the paste was transferred into a hot air oven and dried at 90° C. for 20 hours. The resulting product weighed 63.3 g. Quantitative analysis revealed the product was comprised of 20.37% zinc and 46.5 % methionine. This indicated a proper ratio of zinc to methionine for a 1:1 complex of zinc methionine. Further analysis by infrared analysis and titration curve analysis indicated the presence of zinc methionine acid sulphate as per the previous example. The product was a dry-free-flowing powder.

While the paste of this example was hot air oven dried, other preparations have been prepared where the resulting solutions where spray-dried in a spray dryer at a temperature of about 400° F. to yield a dry free-flowing powder.

EXAMPLE 3

Zinc chloride (Zn $Cl_2$, 68.0g, 0.5 mol) was dissolved in water (68.0 g) and the solution was heated to 90° C. Methionine (74.6 g, 0.5 mol) was added and the temperature was kept at 90° C. for 1 hour to provide zinc methionine chloride solution. The product contained 21.2% zinc and 53.9% methionine. Quantitative and instrumental analysis as previously described revealed the presence of a 1:1 complex salt of zinc methionine chloride.

EXAMPLE 4

Methionine (74.6g, 0.5 mol) was dissolved in a 165 ml of 6.08 N hydrochloric acid and zinc oxide (40.65 g) was added. The mixture was heated at 90° C. for 1 hour to provide zinc methionine chloride solution. The product contained 19.9% zinc and 44.0% methionine. The presence of zinc methionine chloride was confirmed by quantitative and instrumental analysis.

EXAMPLE 5

Methionine zinc sulfate (6.2 g, 0.05 mol) was dissolved in 100 ml of $H_2O$. The solution was heated to boiling and a solution of barium acetate (5.1 g, 0.05 mol) in 20 ml of water was added dropwise with stirring, a voluminous precipitate was formed. The mixture was treated with a solution of methionine zinc sulfate until no further precipitation of $BaSO_4$ was observed. The solution was boiled for ten minutes and filtered. The filterate was evaporated to dryness to provide a white powder. The product contained 23.4% zinc the 57.7% methionine. Quantitative and instrumental analysis as previously described revealed the presence of zinc methionine acetate.

EXAMPLE 6

Zinc oxide (8.13 gr) was dissolved in a mixure of 48% hydrobromic acid (33.7 gr) and water (15.0 gr.). Methionine (15.0) was added and the solution was heated at 95° C. for 15 minutes. The mixture was evaporated to dryness. The residue was dried in the oven and the product contains 17.2% zinc and 36.7% methionine. Quantitative and instrumental analysis revealed the presence of zinc methionine bromide.

EXAMPLE 7

The effect of 1:1 zinc methionine complexes on the degree of incorporation of radio-labeled methionine in protein was studied in rats. In one experiment forty-two (42) male Sprague-Dawley rats, average weight 174.3 grams, were self-fed on a diet of Purina Chow and water. Nineteen animals were randomly selected and each was put under light ether anesthesia and administered a single oral dose of 40 mg/kg of body weight 2-[$^{14}$C]-dl-methionine acid sulfate which had been prepared from 2-[$^{14}$C]-dl-methionine, and was put into metabolism cages.

The remaining twenty-three (23) rats were put under light ether anesthesia and administered a single oral dose of a mixture of 19.0 mg/kg of 2-[$^{14}$C]-dl-methionine and 10.5 mg/kg zinc oxide, which are amounts of methionine and zinc equivalent to those present in the dose of zinc methionine acid sulfate administered to the first group of rats.

Twenty-four hours later the rats were sacrificed and the livers were immediately removed. The weights of the livers were determined and portions of the livers were accurately weighed, transferred into 30 ml beakers, mixed with four times their weight of water and homogenized with a polytron ultrasonic homogenizer. A one milliliter portion of each of the homogenates was transferred into a separate 150 ml beaker, mixed with one milliliter of 30% hydrogen peroxide and allowed to stand for thirty (30) minutes. A 0.5 ml portion of each solution was transferred into a separate centrifuge tube and treated with two milliliter of 10% trichloroacetic acid solution, mixed well and allowed to stand for thirty minutes. The mixtures were centrifuged and the supernatants were discarded. Each precipitate was dissolved in two milliliters of 0.4N potassium hydroxide and the solutions were transferred into counting vials and mixed with fifteen milliliter of scintillation cocktail. The radioactivity was measured with a liquid scintillation counter.

The data obtained from the tests described in the immediately preceding paragraph is summarized in the following table.

TABLE I

The incorporation of radioactivity in the liver proteins of rates after the administration of equal amounts of 2-[$^{14}$C]-dl-methionine in the form of zinc [$^{14}$C]-dl-methionine acid sulfate or [$^{14}$C]-dl-methionine.

|  | Zinc [$^{14}$C]-dl-methionine acid sulfate group | | [$^{14}$C]-dl-methionine group | |
|---|---|---|---|---|
| Number of animals | 19 | | 23 | |
| Average weight of rats (S.E.) | 171.5 | (3.8) | 177.0 | (3.0) |
| Average weight of livers (S.E.) | 7.8 | (0.3) | 8.1 | (0.3) |
| Average of ratio of liver weight to rat weight, percent (S.E.) | 4.56 | (0.14) | 4.54 | (0.12) |
| Average cpm*/g liver, (S.E.) | 7.12 | $\times 10^4$ (4.68 $\times 10^3$) | 6.12 | ($10^4$ (3.65 $\times 10^3$) |
| Average of cpm/liver, (S.E.) | 5.52 | $\times 10^5$ (2.6 $\times 10^4$) | 4.85 | $\times 10^5$ (2.7 $\times 10^4$) |
| Average of percent dose/liver (S.E.) | 0.34 | (0.02)$^a$ | 0.29 | (0.01) |

*Counts per minute.

The data indicate that rats which received radio-labeled methionine in the form of zinc methionine sulfate complex converted more of the amino acid methionine to protein in the liver than the rats which received an equivalent amount of the amino acid alone. Thus 1:1 zinc methionine complexes provide a significantly greater body conversion of methionine to protein than is obtained when feeding methionine alone.

EXAMPLE 8

A pilot clinical study performed in a double blind manner was undertaken to assess the relative effectiveness of 1:1 zinc methionine acid sulfate in patients afflicted with acne vulgaris. Two groups of patients were studied as follows:

a. Group I, which comprised seven patients which received daily facial cleansing plus a placebo medication for a 12-week period.

Group II, which comprised 10 patients, received daily facial cleansing plus a 100 milligram twice daily dosage of 1:1 zinc methionine acid sulfate for a 12-week period.

It was expected that regular daily facial cleansing would in and of itself improve the acne considerably over the 12-week study period. However, in the event that the active 1:1 zinc methionine acid sulfate compound was a useful adjunct to the facial cleansing, it was to be expected that the compound would show either:

a. A greater degree of improvement than the placebo group over the 12-week period, or b. an earlier decrease of lesions, if the lesions in both groups decreased equally in a 12-week period. The daily facial cleansing habits, as nearly as possible, were controlled to provide equal facial cleansing for both group I and group II.

Prior to the start of the testing, the severity scale of the acne lesions for each group was assessed using a scale of zero to three, with zero being no acne and three being extremely severe. The beginning rating for the placebo group was 2.8 and the beginning rating for the 10-patient group receiving the active ingredient was 2.1. The difference in beginning ratings was not statistically significant.

Over the entire 12-week period, both groups responded to the regular daily facial cleansing and both groups showed a decrease in the severity scale to approximately 1.0, which represented a 50% reduction in acne. However, the placebo group did not respond with any improvement until the eighth week of therapy. The group receiving the active ingredient, 1:1 zinc methionine acid sulfate, 100 milligrams administered twice daily, showed significant improvement in lessening the severity of the acne in just six weeks. It therefore can be concluded that the 1:1 zinc methionine acid sulfate plus a facial cleansing produced a reduction in the severity of acne vulgaris in less time than merely good facial cleansin habits alone. Moreover, the difference in severity of the acne comidones between the placebo group, Group I, and the group receiving the active compound, Group II, was statistically significant.

Those patients receiving the active compound had higher plasma levels of zinc than the control patients and showed a large increase in urinary zinc levels during the sixth week of treatment at the same time they showed statistically less severe symptons of acne. The increased urinary excretion of zinc indicates that the patients were in a positive zinc balance, i.e., zinc uptake was greater than the zinc required for normal functions.

What is claimed is:

1. A composition for treating acne comprising a pharmaceutically acceptable carrier and a small but pharmaceutically effective acne alleviating amount of a 1:1 zinc methionine complexed salt of the formula:

$$[CH_3SCH_2CH_2CH(NH_2)COO.Zn^{++}]_w X$$

wherein X is a non-toxic anion which has no inhibiting effect on the therapeutic effectiveness of said 1:1 zinc methionine complex, and W is an integer equal to the anionic charge of X.

2. The composition of claim 1 wherein said anion is an inorganic anion.

3. The composition of claim 2 wherein said compound is 1:1 zinc methionine acid sulfate.

4. The composition of claim 2 wherein said composition is in dosage form, with each dosage containing from about 50 milligrams to about 1500 milligrams of said 1:1 zinc methionine complex.

5. The composition of claim 4 wherein the dosage form of said 1:1 zinc methionine complex contains from about 100 milligrams to about 250 milligrams.

6. The composition of claim 4 wherein said carrier is an orally administrable liquid pharmaceutical carrier.

7. The composition of claim 4 wherein said carrier is an orally administrable water soluble solid pharmaceutical carrier.

8. A method of treating acne in a patient in need thereof which comprises orally administering to said patient a unit dosage of a pharmaceutical composition comprising a pharmaceutically acceptable carrier and a small but pharmaceutically effective acne alleviating amount of a 1:1 zinc methionine complex having the formula:

$$[CH_3SCH_2CH_2CH(NH_2)COO.Zn^{++}]_w X$$

wherein X is a non-toxic inorganic anion inert to the pharmaceutical activity of the 1:1 zinc methionine complex and W is an integer equal to the anionic charge of X.

9. the method of claim 8 wherein said 1:1 zinc methionine complex is zinc methionine acid sulfate.

10. The method of claim 8 wherein said 1:1 zinc methionine complex is zinc methionine chloride.

* * * * *